United States Patent
Galindo et al.

(10) Patent No.: US 9,879,172 B2
(45) Date of Patent: Jan. 30, 2018

(54) MODIFIED HYDROXYETHYL CELLULOSIC POLYMERS FOR IMPROVED WELL BORE FLUIDS AND RELATED USES

(71) Applicant: Halliburton Energy Services, Inc., Houston, TX (US)

(72) Inventors: Kay Ann Galindo, Montgomery, TX (US); Samuel James Maguire-Boyle, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/106,025

(22) PCT Filed: Aug. 20, 2015

(86) PCT No.: PCT/US2015/046065
§ 371 (c)(1),
(2) Date: Jun. 17, 2016

(87) PCT Pub. No.: WO2017/030589
PCT Pub. Date: Feb. 23, 2017

(65) Prior Publication Data
US 2017/0204318 A1     Jul. 20, 2017

(51) Int. Cl.
| | | |
|---|---|---|
| C09K 8/10 | (2006.01) | |
| C09K 8/035 | (2006.01) | |
| C09K 8/528 | (2006.01) | |
| E21B 21/00 | (2006.01) | |
| E21B 37/06 | (2006.01) | |
| E21B 41/02 | (2006.01) | |
| E21B 33/138 | (2006.01) | |

(52) U.S. Cl.
CPC ............... *C09K 8/10* (2013.01); *C09K 8/035* (2013.01); *C09K 8/528* (2013.01); *E21B 21/003* (2013.01); *E21B 33/138* (2013.01); *E21B 37/06* (2013.01); *E21B 41/02* (2013.01); *C09K 2208/12* (2013.01); *C09K 2208/18* (2013.01); *C09K 2208/24* (2013.01); *C09K 2208/26* (2013.01); *C09K 2208/32* (2013.01); *E21B 2021/006* (2013.01)

(58) Field of Classification Search
CPC ..... E21B 21/003; E21B 33/138; C09K 8/887; C08B 11/193; C08B 11/08; C08B 11/20; C08B 15/005
See application file for complete search history.

(56) References Cited

U.S. PATENT DOCUMENTS

| | | |
|---|---|---|
| 3,818,998 A | 6/1974 | Hessert |
| 4,013,821 A | 3/1977 | Engelskirchen et al. |
| | (Continued) | |

OTHER PUBLICATIONS

ISR/WO received in corresponding PCT/US2015/046065, dated May 13, 2016.

*Primary Examiner* — Catherine Loikith
(74) *Attorney, Agent, or Firm* — McDermott Will & Emery LLP (57) ABSTRACT

A method includes placing a downhole fluid including an aqueous base fluid and a viscosifying agent that includes a crosslinked borate-modified hydroxyethyl cellulose (mHEC) polymer in a wellbore penetrating a subterranean formation. Viscosifying agents include those whereby modified hydroxyethyl cellulose is crosslinked with a borate crosslinking agent to form a complex that has sufficient viscosifying and suspension properties to enable their use in downhole fluids.

21 Claims, 4 Drawing Sheets

(56) References Cited

U.S. PATENT DOCUMENTS

| | | | |
|---|---|---|---|
| 4,523,010 | A | 6/1985 | Lukach et al. |
| 5,304,620 | A | 4/1994 | Holtmyer et al. |
| 5,759,964 | A | 6/1998 | Shuchart et al. |
| 6,794,340 | B2 | 9/2004 | Nguyen et al. |
| 7,306,039 | B2 | 12/2007 | Wang et al. |
| 2002/0169085 | A1 | 11/2002 | Miller et al. |
| 2014/0155305 | A1 | 6/2014 | Hartshorne et al. |
| 2015/0075789 | A1 | 3/2015 | Singh et al. |
| 2015/0075792 | A1 | 3/2015 | Brandl et al. |

MODIFIED HYDROXYETHYL CELLULOSIC POLYMERS FOR IMPROVED WELL BORE FLUIDS AND RELATED USES

BACKGROUND

The disclosure herein relates to crosslinkable polymers for use in downhole applications such as drilling and completion operations.

Many subterranean treatments require viscosified fluids. For instance, viscosified fluids may be used as or in drilling fluids, completion fluids, as well as other treating fluids. The term "drilling fluid" as used herein refers to any of a number of liquid and gaseous fluids and mixtures of fluids and solids (as solid suspensions, mixtures and emulsions of liquids, gases and solids) used in operations to drill boreholes into the earth. In some embodiments, a completion fluid may be used to control a well should downhole hardware fail, without damaging the producing formation or completion components. Such viscosified fluids can also be used to stave off the loss of fluids from the well bore to the surrounding formation, for example, when a kick or a thief zone is encountered.

Naturally-derived polymeric viscosifying agents, such as cellulose derivatives, are often preferred over some synthetic agents because of their relative cost. But this cost savings is of little value if the viscosifying agent cannot maintain sufficient viscosity. Maintaining viscosity in a drilling fluid, for example, is important to provide hydrostatic pressure to prevent formation fluids from entering into the well bore, keep the drill bit cool and clean during drilling, carry out drill cuttings, and suspend the drill cuttings while drilling is paused and when the drilling assembly is brought in and out of the hole. Maintaining sufficient viscosity also may be important to control and/or reduce fluid loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a desired time, inter alia, for subsequent recovery of the fluid from the formation.

Further complicating the use of some cellulose derivatives is that they are generally not viewed as thermally stable and easily solubilized. Furthermore, to provide sufficient viscosity, oftentimes cellulosic polymers are crosslinked using metal ions such as zirconium and titanium through techniques well known in the art. Unfortunately, however, the subterranean treatment fluids made with the resulting metal-crosslinked cellulosic polymers are not re-healable, meaning that the viscosity of these fluids degrades irreversibly under shearing and, therefore, is not resilient in drilling operations or other downhole operations that involve changes in shear.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

While the present invention is susceptible to various modifications and alternative forms, specific aspects thereof have been shown by way of example in the figures and are herein described in detail. It should be understood, however, that the description herein of specific aspects is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The disclosure herein relates to borate-crosslinkable modified hydroxyethyl cellulose polymers for use in water-based fluids and pills useful in downhole applications such as in drilling, drill-in, and completion (e.g., packer fluid) operations (referred to herein collectively as "downhole fluids"). A pill is a relatively small amount of the downhole fluid, usually less than 300 bbl, that is used to accomplish a specific task that the regular drilling fluid cannot perform. Examples include high-viscosity pills to help lift cuttings out of vertical wellbore, freshwater pills to dissolve encroaching salt formations, pipe-freeing pills to destroy filter cake and relieve differential sticking forces, and lost circulation material pills to plug a thief zone.

Previously, cellulosic polymers primarily have been crosslinked using metal ion crosslinking agents such as those containing zirconium and titanium ions, as is well known in the art, and the resulting crosslinked polymer complexes have been used as viscosifying agents in a variety of fluids. Unfortunately, subterranean treatment fluids made with these crosslinked cellulosic polymers are not re-healable, meaning that the viscosity of these fluids degrade irreversibly under shear, causing the fluids to lose the necessary viscosity and possibly leave residue in the formation. To counter these problems, as disclosed herein, we have discovered a means of crosslinking modified hydroxyethyl cellulose polymers with borate crosslinking agents in a way that produces borate hydroxyethyl cellulose cross-linked complexes that have sufficient viscosifying and suspension properties to enable their use as downhole fluids. Further, these complexes appear to viscosify brines as well as fresh water fluids, and therefore, can be used in both oil-based and water-based fluids. The borate hydroxyethyl cellulose crosslinked complexes s may also be useful as fluid loss control additives to any downhole fluid wherein fluid loss has been or may be encountered.

Downhole fluids that comprise the borate hydroxyethyl cellulose crosslinked complexes described herein have sufficient viscosifying and suspension properties to satisfy requirements for downhole fluids. Additionally, and perhaps most interestingly, these fluids appear to be rehealing, meaning that when they are exposed to shear forces, the viscosity of the fluid returns to a sufficient level for the purpose of the fluid. This rehealability is believed to represent an advance over previous metal-ion crosslinked cellulosic-based viscosified fluids. Fluids viscosified with complexes formed from the borate-crosslinkable modified hydroxyethyl cellulose polymers described herein are also believed to be relatively heat-tolerant in that they can maintain a sufficient viscosity at elevated temperatures, e.g., 200° F. and above.

The downhole fluids described herein comprise an aqueous base fluid, and a viscosifying agent that comprises a complex formed by the crosslinked reaction product of a borate crosslinking agent and a borate-crosslinkable modified hydroxyethyl cellulose polymer. In certain embodiments, the viscosifying agent should be included in a downhole fluid an amount from about 0.001% to about 5% by weight of the aqueous base fluid. In some embodiments, this amount may be about 0.001% to about 3% by weight of the aqueous base fluid. In some embodiments, this may be about 0.01% by weight to about 2% by weight of the aqueous base fluid. In some embodiments, this amount may be 0.1% by weight to about 1% by weight of the aqueous base fluid.

The viscosifying agent may be formed before being combined with the aqueous base fluid, within the aqueous fluid after combining the components, or after the downhole fluid is pumped into the wellbore. For instance, the crosslinking agent and the polymer can be added to the aqueous base fluid in a desired order based on the particular job requirements and wellbore conditions, before, during or after the placement of the downhole fluid in the wellbore. Preferably, the viscosifying agent is formed when the fluid is within the wellbore, e.g., through the addition of the crosslinking agent to the fluid. Proceeding in this manner may prevent stress on pumps because pumping a viscosifying fluid requires more pump pressure that place downhole. The particular implications of how the viscosifying agent is formed for a particular use will depend on the application, well bore, conditions, pump pressures, customer requirements, as well as other factors known to those skilled in the art.

The aqueous base fluid in the downhole fluids described herein may be fresh water, salt water (e.g., water containing one or more salts dissolved therein), brine (e.g., saturated salt water), seawater, and any combinations thereof. The brines may contain substantially any suitable salts, including, but not necessarily limited to, salts based on metals, such as, calcium, magnesium, sodium, potassium, cesium, zinc, aluminum, and lithium. Salts of sodium and potassium are preferred. The salts may contain substantially any anions, with preferred anions being less expensive anions including, but not necessarily limited to chlorides, bromides, formates, acetates, and nitrates. The choice of brine may increase the associative properties of the nonionic cellulose ether polymer in the downhole fluid. A person of ordinary skill in the art, with the benefit of this disclosure, will recognize the type of brine and ion concentration needed in a particular application as described herein depending on, among other factors, the other components of the drilling, completion, and workover fluids, the desired associative properties of such fluids, and the like. Generally, the aqueous base fluid may be from any source, provided that it does not contain an excess of compounds that may adversely affect other components in the downhole fluid. Preferably, the aqueous base fluid may be present in the downhole fluids in an amount in the range of about 20% to about 99% by weight of the downhole fluid. Preferably, the base fluid may be present in the downhole fluids in an amount in the range of about 30% to about 90% by weight of the downhole fluid.

The viscosifying agents described herein comprise a complex formed by the crosslinked reaction product of a borate crosslinking agent and a borate-crosslinkable modified hydroxyethyl cellulose polymer (hereinafter referred to as a "crosslinked borate-mHEC complex") formed by a reaction comprising a borate crosslinking agent and a borate-crosslinkable modified hydroxyethyl cellulose polymer. No particular molecular configuration for the complex is implied by the term as discussed more in detail below.

In the discussion below, the modified hydroxyethyl cellulose polymer will be discussed first, and then the borate crosslinking agents, and later the crosslinking reaction.

Figure 1:
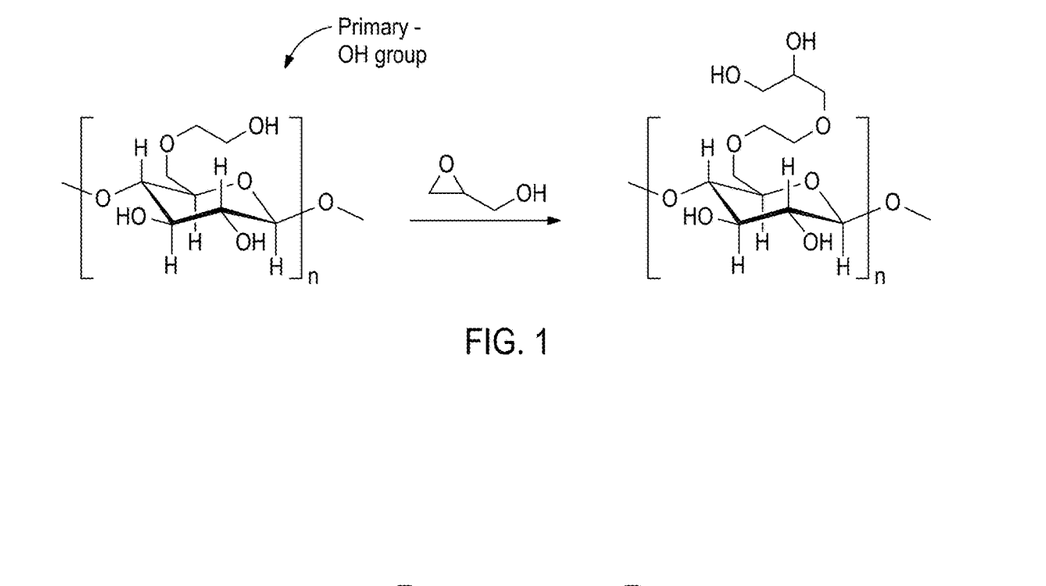
FIG. 1 is an illustration of a reaction scheme showing a reaction according to a description provided herein wherein the reactant is glycidol.

The modified hydroxyethyl cellulose polymers described herein may be modified through etherification or esterification of a hydroxyl group on a hydroxyethyl cellulose molecule. Hydroxyethyl cellulose, for example, has a latent primary hydroxyl group that can be readily modified through either etherification or esterification with a modification reactant as shown in FIG. 1. It has two other hydroxyl groups that can be similarly modified, as recognized by one skilled in the art. The modification reactant can become incorporated into the hydroxyethyl cellulose structure. In some embodiments, the modification reactant may include a dihydroxyl group and the dihydroxyl group to modify an unmodified or underivative cellulosic polymer to allow for crosslinking to occur. For example, as shown in FIG. 1, the modification reactant, glycidol, becomes incorporated into the hydroxyethyl cellulose to produce hydroxyethyl dihydroxypropyl cellulose (HEDHPC). Examples of such polymers may be disclosed in U.S. Pat. Nos. 4,013,821 and 4,523,010.

Other modification reactants that may be used to modify hydroxyethyl cellulose to be used in conjunction with the borate crosslinking agents as described herein may include: epoxy alcohols, diols with halogens, glycidyl ethers, aliphatic glycidyl ethers, aromatic glycidyl ethers, and other glycidyl ether derivatives, and combinations thereof. Modification reactants may also include reactants that include dihydroxyl groups (e.g., dihydroxy ($C_1$-$C_5$) alkyl groups).

In some embodiments, to go to completion the ratio of the modification reactant to the hydroxyethyl cellulose is about 0.1:1 to about 5:1.

The borate crosslinking agents used as described herein include borate crosslinking agents and borate releasing compounds. These include, but are not limited to, borate, boric acid, disodium octaborate tetrahydrate, sodium diborate, ulexite, and colemanite. Derivatives and combinations of these may also be suitable. An example of a commercially available suitable borate releasing compound is commercially available under the trade name "HMP™ Link," "BC-140," and "CL-31" crosslinking agents available from Halliburton Energy Services, Duncan, Ok. Another example of a suitable borate releasing compound is commercially available under the trade name "CL-38™" delayed borate crosslinking agent from Halliburton Energy Services, Duncan, Ok.

Figure 2:
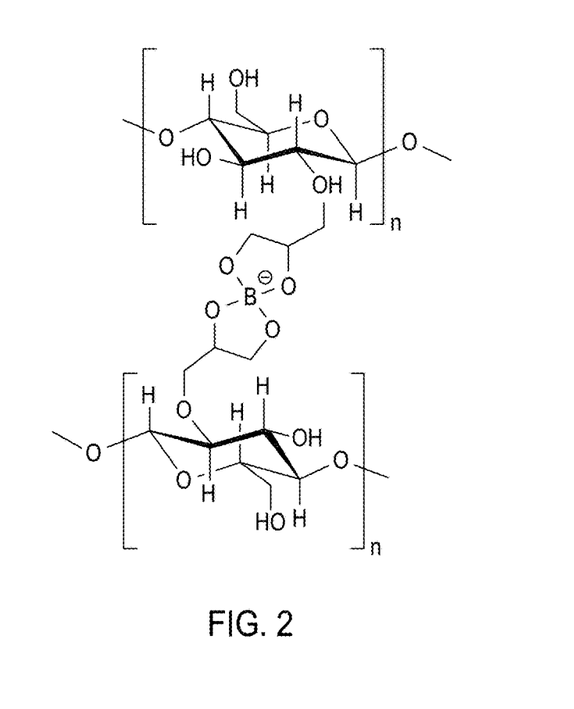
FIG. 2 is a schematic illustration of a possible borate crosslink mechanism according to the description provided herein.

The crosslinking reaction between the borate crosslinking agent and the modified hydroxyethyl cellulose polymer is believed to form a borate-based crosslink between the cellulose molecules, such as possibly illustrated in the schematic representation FIG. 2, which illustrates an example of a theoretical crosslinked borate-mHEC complex as that term is used herein. These crosslinks among the polymer molecules form a viscosifying complex that acts as a viscosifying agent for the downhole fluid.

When a fluid is mixed before placing it downhole, the fluid is preferably basic. For example, during mixing the pH of the downhole fluids should preferably be adjusted to above about 8 to about 12.5 Those skilled in the art, with the benefit of this disclosure, will be able to adjust the pH range in the viscosified aqueous fluids as desired based on the conditions present. In some embodiments, the borate crosslinking agent can be added to the modified hydroxyethyl cellulose without sufficient formation of the complex to complicate pumping conditions above-ground as long as the pH of the downhole fluid is sufficiently basic (e.g., pH<10). This higher pH of 10-12 is thought to prevent premature crosslinking in the fluids disclosed herein. If the pH is too basic, e.g., pH>12, however, crosslinking may occur, which may not be desirable depending on the state of the operation. In other embodiments, the borate crosslinking agent may be added to the fluid in situ downhole to form the viscosifying agent and thus viscosify the method. Either method is contemplated herein.

To minimize pump pressures, it may be desirable to add the borate crosslinking agent to the downhole fluid after the downhole fluid has been placed in a borehole. The amount added is an amount sufficient, inter alia, to provide the desired degree of crosslinking. One of ordinary skill in the art, with the benefit of this disclosure, should be able to determine the appropriate amount and type of crosslinking agent to include for a particular application. In some embodiments, the amount of crosslinking agent may range from about 0.001% by weight to about 5% by weight of the fluid with preference for 0.5-1.5% by weight. In some embodiments, 0.75% to about 1% is preferred.

In some embodiments, if needed, a pH adjuster may be added to adjust the pH of the fluid. The amount of pH adjuster that is needed will depend on the necessary pH change as recognized by one skilled in the art. In most embodiments, to minimize stress on pumping equipment, the crosslinking agent is added to the fluid once the fluid is placed downhole and the complexes are allowed to form and viscosify the fluid downhole. Examples of suitable pH adjusters include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, sulfamic acid, sodium hydroxide, potassium hydroxide, calcium hydroxide, and the like. Derivatives and combinations of these may be suitable as well. One of ordinary skill in the art, with the benefit of this disclosure, will recognize the appropriate pH buffer and amount of pH buffer to use for a chosen application.

Optionally, other additives may be included as well in a downhole fluid described herein as discussed below depending on the purpose of the fluid and the field conditions involved in any particular job as recognized by one skilled in the art. These additives may include bridging agents, pH adjusters, weighting agents, breakers, and the like, as are commonly used in drilling fluids and other downhole fluids. Examples include, but are not limited to, filtration control agents, biocides, corrosion inhibitors, gel stabilizers, viscosifiers, scale inhibitors, antifoaming agents and defoaming agents, foaming agent, fluid loss control additives, shale swelling inhibitors, radioactive tracers, surfactants, crosslinking agents, particulates, salts, scavengers, and combinations thereof. Other additives may be suitable as well, depending on the particular conditions presented.

Additional additives may be added to the downhole fluids as deemed appropriate for a particular application by one skilled in the art, with the benefit of this disclosure. Examples of such additives include, but are not limited to, bridging agents, weighting agents, biocides, corrosion inhibitors, gel stabilizers, viscosifiers, surfactants, scale inhibitors, antifoaming agents, foaming agents, fluid loss control additives, shale swelling inhibitors, radioactive tracers, defoamers, surfactants, crosslinking agents, particulates, pH-adjusters, salts, breakers, delinkers, weighting agents, scavengers, corrosion inhibitors, combinations thereof, and the like, and numerous other additives suitable for use in subterranean operations.

In some applications, after the downhole fluid has performed its desired function, its viscosity may be reduced. For example, in some operations, once the viscosity is reduced, the downhole fluid may be flowed back to the surface, and the well may be returned to production. The viscosity of the downhole fluids may be reduced by a variety of means. Breakers (the term "breakers" as used herein includes both breakers and delinkers in terms of mechanism of the break and subsequent reduction in viscosity) capable of reducing the viscosity of the downhole fluids at a desired time may be included in the downhole fluid to reduce the viscosity thereof. Any breaker that is able to reduce the viscosity of the downhole fluids when desired is suitable for use in the methods as described herein. Preferably, delayed gel breakers that will react with the downhole fluids after desired delay periods may be used. Suitable breakers may be materials that are slowly soluble in a downhole fluid. Examples of suitable breakers include, but are not limited to, enzyme breakers, such as alpha and beta amylases, amyloglucosidase, invertase, maltase, cellulase, and hemicellulase; acids, such as maleic acid and oxalic acid; and oxidizing agents, such as sodium chlorite, sodium bromate, sodium persulfate, ammonium persulfate, magnesium peroxide, lactose, ammonium sulfate, and triethanol amine. An example of a suitable breaker is commercially available under the trade name "VICON NF™" breaker from Halliburton Energy Services, Duncan, Ok. Preferably, these breakers can be encapsulated with slowly water-soluble or other suitable encapsulating materials. Examples of water-soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics, other polymeric materials, and the like. The appropriate breaker and amount thereof may depend upon the formation characteristics and conditions, the pH of the downhole fluid, and other factors known to individuals skilled in the art with the benefit of this disclosure. Preferably, the breaker may be included in a downhole fluid in an amount in the range of from about 0.001% to about 5% by weight of the aqueous base fluid, with about 0.5% to about 1.5% being the preferred range within that range by weight of the aqueous base fluid.

In some embodiments, the downhole fluids may comprise bridging agents, e.g., for forming a filter cake downhole. Any suitable bridging agent useful in downhole applications may be used in the downhole fluids described herein, including acid soluble bridging agents.

The downhole fluids may be prepared by any suitable method. The downhole fluids as described herein may be produced at the well site, for example, in a mixing tank or in a mixer and then promptly placed downhole. Furthermore, additional additives, as discussed above may be combined with the aqueous base fluid and/or the borate-crosslinkable modified hydroxyethyl cellulose polymers as desired in either embodiment. To form downhole fluid, a borate crosslinking agent, as discussed above, may be added to the aqueous base fluid that comprises the borate-crosslinkable modified hydroxyethyl cellulose polymers and other suitable additives, but preferably is added once the fluid is in a downhole location.

An example method as described herein may include providing a downhole fluid comprising an aqueous base fluid and a viscosifying agent comprising a crosslinked borate-mHEC complex; and introducing the downhole fluid into the subterranean formation having a bottom hole temperature of about 200° F. (93° C.) or more.

An example method as described herein may include providing a downhole fluid comprising an aqueous base fluid that has a modified hydroxyethyl cellulose and placing it downhole; and adding a borate crosslinking agent to the downhole fluid in situ to form a crosslinked borate-mHEC complex. In some embodiments, an additional step in the method would involve recovering the downhole fluid at the surface of the borehole. In some embodiments of the method, a step may involve sealing a fluid loss area in the borehole. A fluid loss area in the borehole is an area in the borehole in which fluid is being lost to the surrounding formation. Optionally, a breaker may be added to the downhole fluid to break the fluid. The fluid can then be recovered if desired.

The downhole fluids as described herein may be placed into the well bore as a pill in drilling, or completion operations. Another example of a method as described herein comprises using the downhole fluids prior to a cementing operation, for example, as a completion fluid, e.g., a packer fluid.

The downhole fluids described herein may be placed into the subterranean formation as a viscosified pill or a pill that is viscosified in situ during an underbalanced drilling operation. An underbalanced drilling operation may be referred to as a managed pressure drilling operation by some skilled in the art.

In one embodiment, the following steps may be used to place a barrier pill comprising a downhole fluid as described herein in a wellbore. First, a section of the wellbore is drilled or stripped out while using a managed pressure drilling control system (where the drilling fluid is maintained at a high pressure to balance the pressure of formation fluids). Second, approximately 200-250 feet of the barrier pill is placed in the wellbore using a pump. (Then the barrier pill is crosslinked). Third, the bottom of the drill string is pulled up about 20 feet above top of the barrier pill and the gel is allowed to form for about 30 minutes. Fourth, a high density mud cap is placed above the barrier pill by displacing the drilling fluid. Finally, the operator may trip out of wellbore without using the managed pressure drilling control system.

According to this embodiment, when the operator is ready to resume drilling operation, the following steps may be used to remove the barrier pill from the wellbore. First, the operator trips back to top of barrier pill and activates the managed pressure drilling control system. Second, the mud cap is displaced with drilling fluid. Third, the wellbore pressure is controlled with the managed pressure drilling system while rotating and/or washing through the barrier pill to destroy the gel plug and incorporate the pill into the active system. Once the barrier pill has been removed, the operator may continue drilling forward or perform casing operations.

Alternatively, the mud cap can be removed by tripping back to the barrier pill and treating the pill with breaker. After the breaker has broken the pill, the pill can be incorporated into the active downhole fluid. The drilling operations or casing operations can proceed.

The downhole fluids disclosed herein may directly or indirectly affect one or more components or pieces of equipment associated with the preparation, delivery, recapture, recycling, reuse, and/or disposal of the disclosed downhole fluids. For example, and with reference to FIG. 5, the disclosed downhole fluids may directly or indirectly affect one or more components or pieces of equipment associated with an exemplary wellbore drilling assembly 100, according to one or more embodiments. It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

Figure 5:
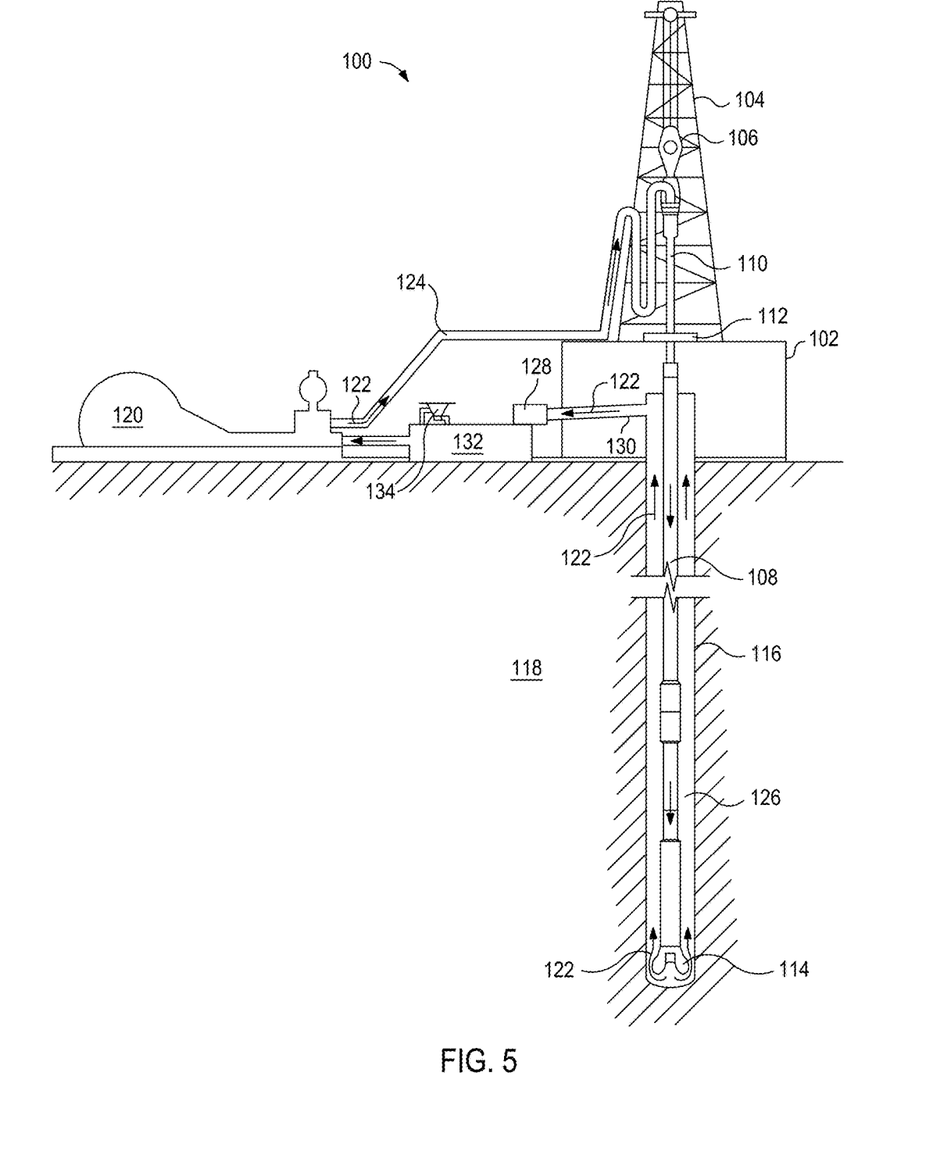
FIG. 5 illustrates components or pieces of equipment associated with an exemplary wellbore drilling assembly.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed downhole fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed downhole fluids may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed downhole fluids may be stored, reconditioned, and/or regulated until added to the drilling fluid 122.

As mentioned above, the disclosed downhole fluids may directly or indirectly affect the components and equipment of the drilling assembly 100. For example, the disclosed downhole fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary downhole fluids.

The disclosed downhole fluids may directly or indirectly affect the pump 120, which representatively includes any conduits, pipelines, trucks, tubulars, and/or pipes used to fluidically convey the downhole fluids downhole, any pumps, compressors, or motors (e.g., topside or downhole) used to drive the downhole fluids into motion, any valves or related joints used to regulate the pressure or flow rate of the downhole fluids, and any sensors (i.e., pressure, temperature, flow rate, etc.), gauges, and/or combinations thereof, and the like. The disclosed downhole fluids may also directly or indirectly affect the mixing hopper 134 and the retention pit 132 and their assorted variations.

The disclosed downhole fluids may also directly or indirectly affect the various downhole equipment and tools that may come into contact with the downhole fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed downhole fluids may also directly or indirectly affect any downhole heat exchangers, valves and corresponding actuation devices, tool seals, packers and other wellbore isolation devices or components, and the like associated with the wellbore 116. The disclosed downhole fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed downhole fluids may also directly or indirectly affect any transport or delivery equipment used to convey the downhole fluids to the drilling assembly 100 such as, for example, any transport vessels, conduits, pipelines, trucks, tubulars, and/or pipes used to fluidically move the downhole fluids from one location to another, any pumps, compressors, or motors used to drive the downhole fluids into motion, any valves or related joints used to regulate the pressure or flow rate of the downhole fluids, and any sensors (i.e., pressure and temperature), gauges, and/or combinations thereof, and the like.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments as described herein. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments as described herein, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Embodiments disclosed herein include Embodiment A, Embodiment B, and Embodiment C.

Embodiment A: A method comprising: placing a downhole fluid comprising an aqueous base fluid and a viscosifying agent that comprises a crosslinked borate-mHEC complex in a wellbore penetrating a subterranean formation.

Embodiment A may have one or more of the following additional elements in any combination:

Element A1: The aqueous base fluid in the downhole fluids described herein may be fresh water, salt water (e.g., water containing one or more salts dissolved therein), brine (e.g., saturated salt water), seawater, and any combinations thereof. The aqueous base fluid may be present in the downhole fluids in an amount in the range of about 20% to about 99% by weight of the downhole fluid. Element A1 includes the base fluid may be present in the downhole fluids in an amount in the range of about 30% to about 90% by weight of the downhole fluid.

Element A2: The viscosifying agents described herein comprise a complex formed by the crosslinked reaction product of a borate crosslinking agent and a borate-crosslinkable modified hydroxyethyl cellulose polymer (hereinafter referred to as a "crosslinked borate-mHEC complex") formed by a reaction comprising a borate crosslinking agent and a borate-crosslinkable modified hydroxyethyl cellulose polymer. The viscosifying agent is present in an amount from about 0.001% to about 5% by weight of the aqueous base fluid.

Element A2a: The borate crosslinking agents include borate crosslinking agents and borate releasing compounds. These include, but are not limited to, borate, boric acid, disodium octaborate tetrahydrate, sodium diborate, ulexite, and colemanite. Derivatives and combinations of these may also be suitable.

Element A3: When a fluid mixed before placing it downhole, the fluid is preferably basic with a pH of about 8 to about 12 preferably pH <10 to prevent early crosslinking.

Element A4: The downhole fluid includes an additive selected from the group consisting of: a bridging agent, a pH adjuster, a filtration control agent, a weighting agent, a biocide, a corrosion inhibitor, a gel stabilizer, a viscosifier, a surfactant, a scale inhibitor, an antifoaming agent, a foaming agent, a fluid loss control additive, a shale swelling inhibitor, a radioactive tracer, a defoamer, a surfactant, a crosslinking agent, a particulate, a salt, and a scavenger.

By way of non-limiting example, exemplary combinations applicable to Embodiment A include: combinations of Elements A1-A4; combinations of Elements A1 and A2 (including A2a); Elements A1, A2 (including A2a), A3; Elements A1, A2 (including A2a), A3, and A4.

Embodiment B: A method comprising: placing a downhole fluid comprising an aqueous base fluid and a modified hydroxyethyl cellulose polymer downhole as part of a downhole operation; and adding a borate crosslinking agent to the downhole fluid to provide crosslinking in situ in the well bore to form a crosslinked borate-mHEC complex in the downhole fluid. Embodiment B may include recovering the downhole fluid at the surface of the well bore post-job. Embodiment B may include sealing a fluid loss area in the borehole. Embodiment B may include a well bore has a bottom hole temperature of about 200° F. (93° C.) or more.

Embodiment B may have one or more of the following additional elements in any combination:

Element B1: The aqueous base fluid in the downhole fluids described herein may be fresh water, salt water (e.g., water containing one or more salts dissolved therein), brine (e.g., saturated salt water), seawater, and any combinations thereof. The aqueous base fluid may be present in the downhole fluids in an amount in the range of about 20% to about 99% by weight of the downhole fluid. Preferably, the base fluid may be present in the downhole fluids in an amount in the range of about 30% to about 90% by weight of the downhole fluid.

Element B2: The viscosifying agents described herein comprise a complex formed by the crosslinked reaction product of a borate crosslinking agent and a borate-crosslinkable modified hydroxyethyl cellulose polymer (hereinafter referred to as a "crosslinked borate-mHEC complex") formed by a reaction comprising a borate crosslinking agent and a borate-crosslinkable modified hydroxyethyl cellulose polymer. The viscosifying agent is present in an amount from about 0.001% to about 5% by weight of the aqueous base fluid. The borate crosslinking agents include borate crosslinking agents and borate releasing compounds. These include, but are not limited to, borate, boric acid, disodium octaborate tetrahydrate, sodium diborate, ulexite, and colemanite. Derivatives and combinations of these may also be suitable.

Element B3: When a fluid mixed before placing it downhole, the fluid is preferably basic with a pH of about 8 to about 12 preferably pH<10 to prevent early crosslinking.

Element B4: The downhole fluid includes an additive selected from the group consisting of: a bridging agent, a pH adjuster, a filtration control agent, a weighting agent, a biocide, a corrosion inhibitor, a gel stabilizer, a viscosifier, a surfactant, a scale inhibitor, an antifoaming agent, a foaming agent, a fluid loss control additive, a shale swelling inhibitor, a radioactive tracer, a defoamer, a surfactant, a crosslinking agent, a particulate, a salt, a breaker, and a scavenger.

Element B5: The downhole fluid includes a breaker, and the breaker includes a compound selected from the group consisting of: an enzyme breaker, alpha amylase, beta amylase, amyloglucosidase, invertase, maltase, cellulase, and hemicellulase; acids, maleic acid, oxalic acid, an oxidizing agent, sodium chlorite, sodium bromate, sodium persulfate, ammonium persulfate, magnesium peroxide, lactose, ammonium sulfate, triethanol amine, and an encapsulated breaker.

Element B6: The downhole fluid is in the form of a pill.

By way of non-limiting example, exemplary combinations applicable to Embodiment B include: combinations of Elements B1-B5, B1 and B2 (including B2a); Elements B1, B2 (including B2a), and B3; Elements B1, B2 (including B2a), B3, and B4; Elements B1, B2 (including B2a), B3, B4 and B5; and any of the foregoing in combination with Element B6.

Embodiment C: A method comprising: providing a downhole fluid comprising an aqueous base fluid and a viscosifying agent comprising a crosslinked borate-mHEC complex; and introducing the downhole fluid into the subterranean formation having a bottom hole temperature of about 200° F. (93° C.) or more. Embodiment C may have one or more of the following additional elements in any combination:

Embodiment C may have one or more of the following additional elements in any combination:

Element C1: providing a downhole fluid comprising an aqueous base fluid and a viscosifying agent comprising a crosslinked borate-mHEC complex. The downhole fluid includes an aqueous base fluid that includes fresh water, salt water (e.g., water containing one or more salts dissolved therein), brine (e.g., saturated salt water), seawater, and any combinations thereof.

Element C2: viscosifying agents including a complex formed by the crosslinked reaction product of a borate crosslinking agent and a borate-crosslinkable modified hydroxyethyl cellulose polymer (hereinafter referred to as a "crosslinked borate-mHEC complex") formed by a reaction comprising a borate crosslinking agent and a borate-crosslinkable modified hydroxyethyl cellulose polymer. The viscosifying agent is present in an amount from about 0.001% to about 5% by weight of the aqueous base fluid. The borate crosslinking agents include borate crosslinking agents and borate releasing compounds. These include, but are not limited to, borate, boric acid, disodium octaborate tetrahydrate, sodium diborate, ulexite, and colemanite. Derivatives and combinations of these may also be suitable.

Element C3: an additive selected from the group consisting of: a bridging agent, a pH adjuster, a filtration control agent, a weighting agent, a biocide, a corrosion inhibitor, a gel stabilizer, a viscosifier, a surfactant, a scale inhibitor, an antifoaming agent, a foaming agent, a fluid loss control additive, a shale swelling inhibitor, a radioactive tracer, a defoamer, a surfactant, a crosslinking agent, a particulate, a salt, a breaker, and a scavenger.

Element C4: the fluid is basic with a pH of about 8 to about 12 preferably pH<10 to prevent early crosslinking.

By way of non-limiting example, exemplary combinations applicable to Embodiment B include: combinations of Elements C1-C4; C1-C3; C1-C2.

To facilitate a better understanding of the embodiments as described herein, the following examples of preferred or representative embodiments are given. In no way should the following examples be read to limit, or to define, the scope of the invention. Representative examples are shown below.

EXAMPLES

Fluid Formulation

Table 1 below reflects the drilling fluid formulations of freshwater fluids and brine fluids including the complexes of the modified hydroxyethyl cellulose ("HEDHPC") polymers described above. A 10 lb/gal drilling fluid formulation was prepared with a 2.10 and a 1.00 lb/bbl HEDHPC, respectively Fluid 1 and Fluid 3. Fluid 2 included 2.45 lb/bbl HEDHPC. All components were added sequentially while stirring on a conventional lab multimixer.

TABLE 1

| Drilling Fluid Formulation (10.0 lb/gal) | Source | FLUID 1 | FLUID 2 | FLUID 3 |
|---|---|---|---|---|
| Fresh water, bbl | Tap water, Houston, TX | 0.91 | — | 0.91 |
| 8.6 lb/gal KCl brine, bbl | Prepared brine available from Halliburton Energy Services | — | 0.92 | — |

TABLE 1-continued

| Drilling Fluid Formulation (10.0 lb/gal) | Source | FLUID 1 | FLUID 2 | FLUID 3 |
|---|---|---|---|---|
| BARA-DEFOAM HP ™, lb/bbl | Defoamer available from Halliburton Energy Services | 3 drops | 3 drops | 3 drops |
| HEDHPC, lb/bbl | Available from SE Tylose in Germany | 2.10 | 2.45 | 2.10 |
| DEXTRID E ™, lb/bbl | Filtration control agent available from Halliburton Energy Services | 8.77 | 8.77 | 8.77 |
| PAC-L ™, lb/bbl | Filtration control agent (low viscosity polyanionic cellulose) available from Halliburton Energy Services | 2.10 | 2.10 | 2.10 |
| Soda Ash, lb/bbl | pH buffer (sodium carbonate) available from Halliburton Energy Services | 0.35 | 0.35 | 0.35 |
| BARACARB 5 ™, lb/bbl | Bridging agent available from Halliburton Energy Services | 15.0 | 15.0 | 15.0 |
| Barite, lb/bbl | Weighting agent available from Halliburton Energy Services | 73.0 | 60 | 73 |

While the viscosities of Fluid 1 and Fluid 2 were high, the viscosity can be readily adjusted by reducing the amount of the modified hydroxyethyl cellulose polymer (HEDHPC) in the fluid formulation as shown in formulation for Fluid 3 in Table 2. Thus, even before cross-linking, Fluids 1 and 2 have a higher viscosity.

Uncrosslinked HEDHPC has been shown to have superior hydration characteristics, and it works well in both fresh water and multivalent brines, albeit possibly with reduced efficiency in brine containing formulations.

TABLE 2

| 10.0 lb/gal Formulation | FLUID 1 | FLUID 2 | FLUID 3 |
|---|---|---|---|
| Dynamic Aging @ ° F. | — | 150 | — | 150 | — |
| Aging Time, h | — | 16 | — | 16 | — |
| Fann 35 Data at Temperature @ 120° F. | | | | | |
| 600 rpm | 193 | 215 | 162 | 207 | 110 |
| 300 rpm | 129 | 137 | 103 | 130 | 68 |
| 200 rpm | 99 | 106 | 78 | 99 | 50 |
| 100 rpm | 63 | 65 | 48 | 62 | 30 |
| 6 rpm | 10 | 7 | 7 | 9 | 4 |
| 3 rpm | 6 | 4 | 5 | 5 | 3 |
| Plastic Viscosity, cP | 64 | 78 | 59 | 77 | 42 |
| Yield Point, lb/100 ft$^2$ | 65 | 59 | 44 | 53 | 26 |

As a comparison, fluids were prepared according to Table 1, but the HEDHPC was exchanged for a typical xanthan-based viscosifying agent, "BARAZAN D PLUS™" (available from Halliburton Energy Services). A comparison fluid corresponding to Fluid 2 was made using 1.45 lb/bbl BARAZAN D PLUS and another comparison fluid corresponding to Fluid 3 was prepared with 1.10 lb/bbl BARAZAN D PLUS. The rheological results of the comparison examples as compared to Fluids 2 and 3 with the HEDHPC complex are below.

COMPARISON TABLE 2

| Rheology Data | Fluid 2 | Fluid 2 (comp. xanthan) | Fluid 3 | Fluid 3A (comp. xanthan) |
|---|---|---|---|---|
| Plastic Viscosity, cP | 68 (avg) | 38 | 60.5 (avg) | 16 |
| Yield Point, lb/100 ft$^2$ | 48.5 (avg) | 32 | 39.5 | 20 |

Figure 3:
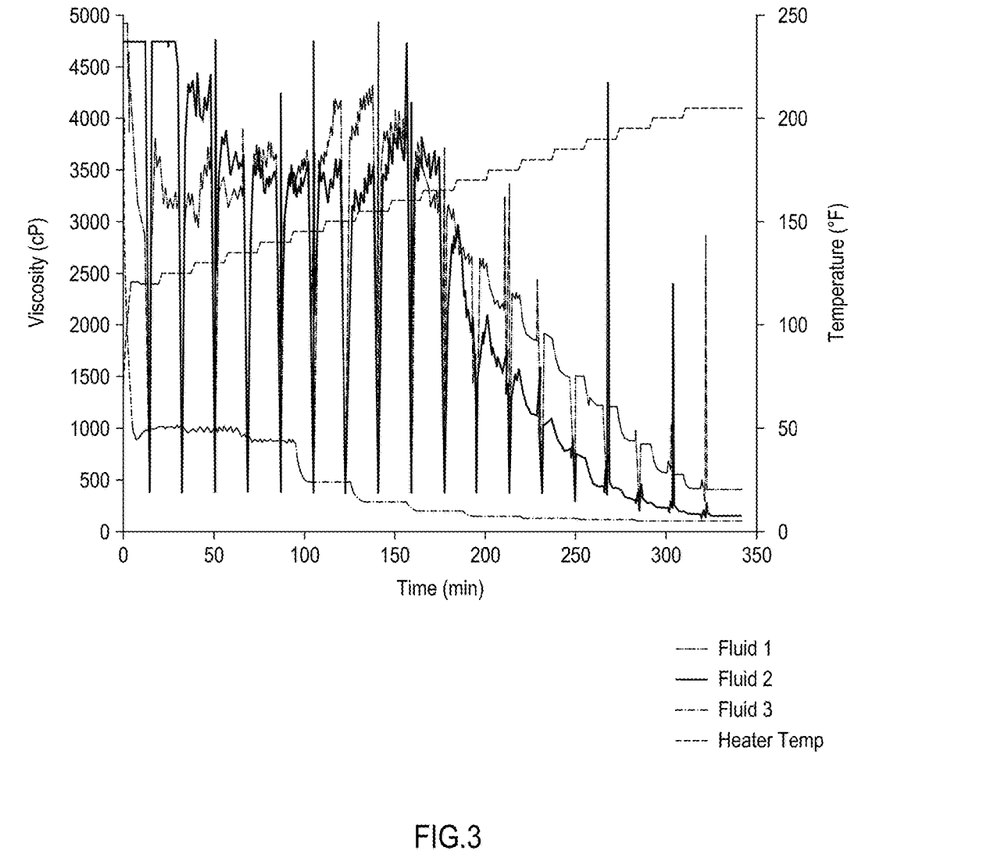
FIG. 3 is an illustration of Chandler 5550 rheology data for three drilling fluid samples from Fluid 1, Fluid 2, and Fluid 3 as described in the Examples section herein.

The pH of the respective resulting formulations was adjusted from about 9.5 to about 12.7 with sodium hydroxide (1.25 lb/bbl). The resulting mixture was allowed to stir on a typical lab multimixer and 3.63 lb/bbl of a borate crosslinking agent (BC-140™) was added. (An illustration of a possible crosslink complex formed by a crosslinking reaction under these conditions is shown in FIG. 2, as described above.) The resulting crosslinked fluids were these tested on the Chandler 5550 Rheometer, commercially available from Chandler Engineering by measuring the viscosity at different temperatures between 40 s$^{-1}$ baseline shear. Both Fluid 1 and Fluid 2 were subjected to high shear regimes between temperature steps to determine the rehealability of the fluid. The high shear regime involved going from 40 s$^{-1}$ to 511 s$^{-1}$ then returns to 40 s$^{-1}$. FIG. 3 illustrates the results observed when these crosslinked fluids were tested on the Chandler 5550.

Crosslinking

FIG. 3 indicates a potential for borate crosslinked HEDHPC polymer. It also indicates that the viscosity of a fluid can be adjusted by altering the relative concentration of borate crosslinked HEDHPC polymer, as can be seen in the difference in rheology of the Fluid 1 and Fluid 3 curves on FIG. 3. The ability to crosslink this system (thus increasing viscosity) can also be specifically targeted using well-known delayed cross-linking agents.

The borate cross-linked HEDHPC polymer complex appears to be salt tolerant, as can be seen by comparing Fluid 1 (which is fresh water based) and Fluid 2 (8.6 lb/gal KCl is 5.2% by weight KCl, but the fluid 2 has only 4.1% by weight KCl of the fluid).

Figure 4:
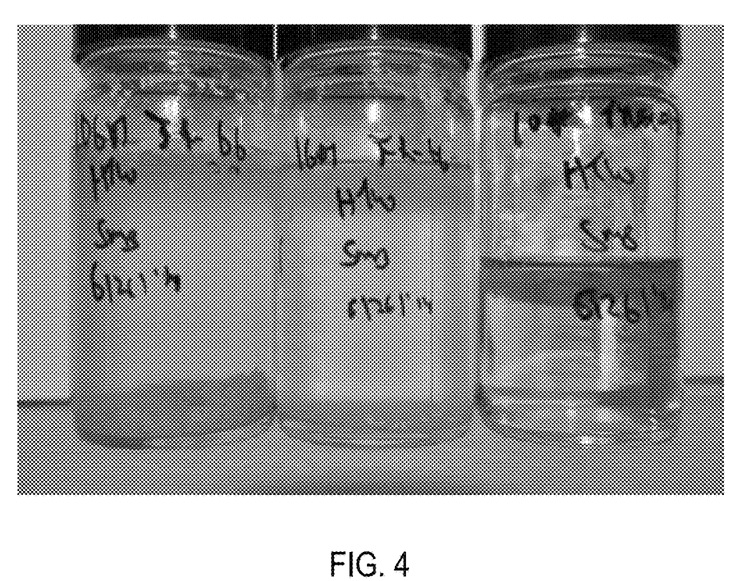
FIG. 4 is a photograph representation of a visual inspection of three samples as described in the Examples section herein.

Additionally, in FIG. 4, salt tolerance for multivalent salts is illustrated. FIG. 4 illustrates the visual inspection of 10 GPT FR-66 (left jar), 1 GPT FR-66 (middle jar), and a 10 PPTG of HEDHPC all in a synthetic sea water with 100 ppm of iron added showing precipitation of FR-66 and no precipitation of HEDHPC. In this solution, 10 lbs/1000 gal of HEDHPC easily dissolves in synthetic sea water containing 1.94, 1.08, 0.13, 0.04, and 0.04 wt% of Na, Mg, Ca, and K respectively as well as containing 100 ppm of Fe ions.

Heat Tolerance, Rehealability

The fluids comprising the borate cross-linked HEDHPC polymer complexes (Fluid 1 and Fluid 2) also display satisfactory heat tolerance showing a viscosity of 1000 cP at 200° F. All three fluid samples were subjected to a 40 s$^{-1}$ baseline shear (FIG. 3). Both Fluid 1 and Fluid 2 were subjected to high shear regimes between temperatures steps to determine the rehealability of the fluid. The high shear regime involved going from 40 s$^{-1}$ to 511 s$^{-1}$ then returns to 40 s$^{-1}$. This regime may mimic the high shear that a drilling fluid may experience while passing through a drill bit perforation, for example.

The crosslinks were broken after addition of 1.36 lb/bbl "VICON NF" breaker (available from Halliburton Energy Services) and 0.09 lb/bbl acetate salt mixture (specifically cobalt acetate and ammonium acetate), while stirring on the lab multimixer, and subsequent exposure to dynamic aging conditions at 150° F. for 16 h. The fluid samples were then tested on the Fann 35 Viscometer (available from Fann Instrument Co., Houston, Tx.), at 120° F. by measuring the shear stress of the bob at different shear rates between 3 revolutions per minute (rpm) to 600 rpm (units: lb/100 ft$^2$), and determining the plastic viscosity (PV) (units: centipoise (cP)) and the yield point (YP) (units: lb/100 ft$^2$), and the results are below in Table 3.

TABLE 3

| 10.0 lb/gal Formulation | FLUID 1 | | FLUID 2 | | FLUID 3 | |
|---|---|---|---|---|---|---|
| Dynamic Aging @ ° F. | — | 150a | — | 150a | — | 150b |
| Aging Time, h | — | 16 | — | 16 | — | 16 |
| Fann 35 Data at Temperature @ 120° F. | | | | | | |
| 600 rpm | 193 | 51 | 162 | 110 | 110 | 61 |
| 300 rpm | 129 | 28 | 103 | 68 | 68 | 36 |
| 200 rpm | 99 | 19 | 78 | 50 | 50 | 25 |
| 100 rpm | 63 | 11 | 48 | 30 | 30 | 14 |
| 6 rpm | 10 | 2 | 7 | 4 | 4 | 2 |
| 3 rpm | 6 | 2 | 5 | 3 | 3 | 2 |
| Plastic Viscosity, cP | 64 | 23 | 59 | 42 | 42 | 25 |
| Yield Point, lb/100 ft$^2$ | 65 | 5 | 44 | 26 | 26 | 11 |

Due to the increased loading of HEDHPC in the formulation of Fluid 1 and Fluid 2, additional breaker was needed to completely break the viscosified fluid. An additional 1.80 lb/bbl VICON NF™ breaker and 0.16 lb/bbl of the acetate salt mixture were added to Fluid 1 and Fluid 2, and these samples were again exposed to dynamic aging conditions at 150° F. for 16 hours. The drilling fluid samples were then test on the Fann 35 viscometer. The breaker loadings could be adjusted by adding different concentrations of the breaker.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit as described herein. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. After exposure to the breaker, the fluid appears to be able to easily flowback for removal of the fluid from the wellbore or for the fluid to be incorporated into the entire active system.

The invention claimed is:

1. A method comprising:
   placing a downhole fluid comprising an aqueous base fluid and a viscosifying agent that comprises a crosslinked borate-mHEC complex in a wellbore penetrating a subterranean formation,
   wherein the crosslinked borate-mHEC complex is a modified hydroxyethyl cellulose formed by an etherification of a hydroxyl group on a hydroxyethyl cellulose molecule.

2. The method of claim 1 wherein the downhole fluid is used as a pill in a drilling or completion operation.

3. The method of claim 1 wherein the downhole fluid is used in a completion operation.

4. The method of claim 1 wherein the viscosifying agent is present in an amount from about 0.001% to about 5% by weight of the aqueous base fluid.

5. The method of claim 1 wherein the viscosifying agent is formed in situ in a well bore.

6. The method of claim 1 wherein the downhole fluid further comprises at least one additive selected from the group consisting of: a bridging agent, a pH adjuster, a filtration control agent, a weighting agent, a biocide, a corrosion inhibitor, a gel stabilizer, a viscosifier, a surfactant, a scale inhibitor, an antifoaming agent, a foaming agent, a fluid loss control additive, a shale swelling inhibitor, a radioactive tracer, a defoamer, a crosslinking agent, a particulate, a salt, and a scavenger.

7. The method of claim 6 wherein the pH adjuster comprises a compound selected from the group consisting of: sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, sulfamic acid, sodium hydroxide, potassium hydroxide, and calcium hydroxide.

8. The method of claim 1 wherein the aqueous base fluid comprises a salt.

9. The method of claim 1 wherein the crosslinked borate-mHEC complex was formed by a reaction comprising hydroxyethyl dihydroxypropyl cellulose and a borate crosslinking agent.

10. The method of claim 9 wherein the borate crosslinking agent comprises at least one of the following compounds: borate, boric acid, disodium octaborate tetrahydrate, sodium diborate, ulexite, and colemanite.

11. The method of claim 1 wherein the pH of the downhole fluid is about 8 to about 10.

12. A method comprising:
   placing a downhole fluid comprising an aqueous base fluid and a modified hydroxyethyl cellulose polymer downhole as part of a downhole operation; and
   adding a borate crosslinking agent to the downhole fluid to provide crosslinking in situ in the well bore to form a crosslinked borate-mHEC complex in the downhole fluid,
   wherein the crosslinked borate-mHEC complex is a modified hydroxyethyl cellulose formed by an etherification of a hydroxyl group on a hydroxyethyl cellulose molecule.

13. The method of claim 12 comprising adding a breaker to the downhole fluid while at least a portion of the fluid is in the well bore.

14. The method of claim 13 wherein the breaker comprises a compound selected from the group consisting of: an enzyme breaker, alpha amylase, beta amylase, amyloglucosidase, invertase, maltase, cellulase, and hemicellulase; acids, maleic acid, oxalic acid, an oxidizing agent, sodium chlorite, sodium bromate, sodium persulfate, ammonium persulfate, magnesium peroxide, lactose, ammonium sulfate, triethanol amine, and an encapsulated breaker.

15. The method of claim 12 further comprising recovering the downhole fluid at the surface of the well bore.

16. The method of claim 12 further comprising sealing a fluid loss area in the borehole.

17. The method of claim 12 wherein the well bore has a bottom hole temperature of about 200° F. (93° C.) or more.

18. The method of claim 12 wherein the downhole fluid is in the form of a pill.

19. The method of claim 18 wherein the pill is a barrier pill and the downhole operation is an underbalanced drilling operation.

20. A method comprising:
providing a downhole fluid comprising an aqueous base fluid and a viscosifying agent comprising a crosslinked borate-mHEC complex; and
introducing the downhole fluid into the subterranean formation having a bottom hole temperature of about 200° F. (93° C.) or more,
wherein the crosslinked borate-mHEC complex is a modified hydroxyethyl cellulose formed by an etherification of a hydroxyl group on a hydroxyethyl cellulose molecule.

21. A system comprising:
a drilling assembly with a drill string extending therefrom and into a wellbore in a subterranean formation; and
a pump fluidly coupled to the drill string, the drill string containing an aqueous base fluid and a viscosifying agent that comprises a crosslinked borate-mHEC complex,
wherein the crosslinked borate-mHEC complex is a modified hydroxyethyl cellulose formed by an etherification of a hydroxyl group on a hydroxyethyl cellulose molecule.

\* \* \* \* \*